Patented Mar. 6, 1951

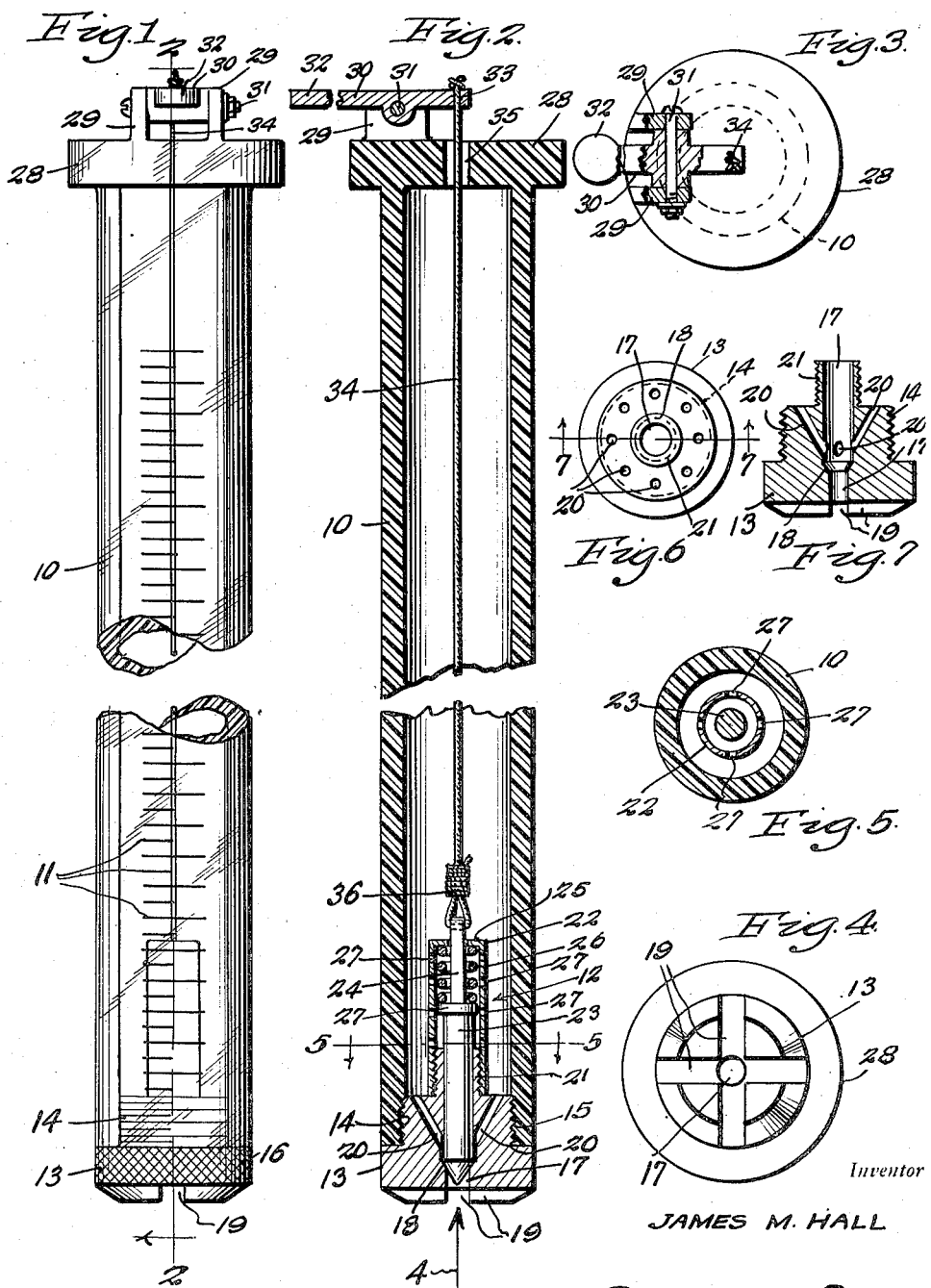

2,544,262

UNITED STATES PATENT OFFICE 2,544,262

LIQUID LEVEL GAUGE

James M. Hall, Phoenix, Ariz.

Application February 26, 1946, Serial No. 650,325

2 Claims. (Cl. 33—126.4)

This invention relates to new and useful improvements and structural refinements in liquid level gauges, more specifically, to a gauge of the character herein described, which is particularly adapted for use in measuring the amount of gasoline in underground storage tanks in service stations and the like.

Heretofore, this measuring has been accomplished by inserting a wooden stick or bar into the tank through the filler opening and determining the level with respect to graduations marked on such stick. However, owing to its capillary action, the gasoline has frequently "crept" upwardly on the stick, and the measurement thus obtained was highly inaccurate.

It is therefore the principal object of the invention to eliminate this disadvantage by entrapping a quantity of gasoline in a transparent graduated tube, from which the level in the tank may be readily and correctly determined.

A further object of the invention is to provide a gauge which is simple in construction, safe in operation, and which cannot easily become damaged.

Another object of the invention is to provide a gauge which, in addition to its primary use for measuring gasoline in storage tanks, may also be employed generally for the measurement of any liquid, contained in various receptacles.

With the above more important objects in view, and such other objects as may become apparent as this specification proceeds, the invention consists essentially of the arrangement and construction of parts as illustrated in the accompanying drawings, in which:

Figure 1 is a side elevation of the invention;

Figure 2 is a cross sectional view, taken in the plane of the line 2—2 in Figure 1;

Figure 3 is a top plan view, partially broken away;

Figure 4 is an underside plan view;

Figure 5 is a cross sectional view, taken in the plane of the line 5—5 in Figure 2;

Figure 6 is a top plan view of a plug used in the invention, and

Figure 7 is a cross sectional view, taken in the plane of the line 7—7 in Figure 6.

Like characters of reference are used to designate like parts in the specification and throughout the several views.

Referring now to the accompanying drawings in detail, the invention consists of a vertically disposed tube 10, constructed of transparent, non-fragile material such as plastic, and provided on the surface thereof, preferably on the inner surface thereof, with suitable graduations 11.

A self closing valve designated generally by the reference character 12, is provided at the lower end of the tube 10, this valve consisting of a plug 13, formed integrally with the externally threaded adapter 14, this being designed for removable engagement with the internally threaded portion 15 provided in the lower end of the tube 10.

The plug 13 may be knurled as shown at 16 and an axial bore 17 is formed in the plug, as will be clearly apparent from the accompanying drawings.

Provided medially the length of the bore 17 is a needle seat 18, hereinafter to be more particularly described, and a pair of diametrically extending fluid passages 19 are formed in the lower end of the plug, in communication with the bore 17.

A plurality of fluid channels 20 are also formed in the body of the plug 13, these channels extending radially and upwardly from the bore 17 and communicating with the interior of the tube 10.

The inner end of the plug 13 is provided with an externally threaded adapter 21 and a tubular casing 22, internally threaded at its lower end, is positioned on the adapter 21, as is best illustrated in the accompanying Figure 2.

A needle 23, configurated substantially as shown, is positioned in the casing 22 and being slidable in the bore 17, coacts with the aforementioned needle seat 18. The upper end of the needle 23 is provided with the stem 24, the latter projecting through a suitable aperture 25 formed in the closed upper end of the casing 22. A compression spring 26 is positioned on the stem 24 between the end of the casing and the needle 23, said spring normally urging the needle against the seat 18. The sides of the casing 22 are also provided with a plurality of liquid passages or openings, assuming the form of apertures 27.

The upper end of the tube 10 is closed by the end plate 28, the latter in turn, carrying a bracket constituted by a pair of upstanding lugs 29.

A lever 30 is pivoted medially of its length by means of a pin or screw 31 to the lugs 29, the outer end of this lever forming an actuating handle or button 32. The remaining, that is, the inner end of the lever 30 is formed with an aperture 33 and a suitable cable 34 is secured at one end thereof in this aperture, as will be clearly apparent from the accompanying drawings. The cable 34 passes through a suitable passage 35 formed in the end plate 28 and is connected at the remaining end thereof to the aforementioned stem 24, as indicated by the reference numeral 36.

Having thus described the constructional details of the invention, its method of operation will now be presented.

When the invention is placed in use, the tube 10 is inserted into the storage tank through a suitable filler opening, until the lower end of the plug 13 contacts the tank floor.

Now by pressing the handle or button 32 downwardly, the cable 34 will be pulled upwardly, raising the associated needle 23 therewith, against the resiliency of the spring 26. Heretofore, the needle has engaged the seat 18 thus closing the channels 20, but as the needle is raised, the gasoline will flow through the passages 19 into the bore 17 and through the channels 20 into the interior of the tube 10.

When the gasoline in the tube has reached the level of the gasoline in the tank, the handle 32 is released and the spring 26 will urge the needle 23 against the seat 18, thus closing the channels 20, and preventing the escape of gasoline from the tube. The gauge as a whole may now be withdrawn from the storage tank and by reading the level of the gasoline in the tube against the graduation 11, the exact level of gasoline in the tank may be readily and accurately determined.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a liquid level gauge including a transparent, graduated tube having an apertured wall at one end, a closure plug at the remaining end of the tube having an axial bore, and a valve normally closing the bore, means for raising the valve from its closed position comprising a lever pivotally mounted on the apertured wall, and a lifting cord carried by the lever and connected to the valve, said lever having an aperture therein, said cord extending through the aperture and having a knot at one end overlying the lever.

2. A liquid level gauge comprising a transparent graduated tube, a support plate at one end of said tube, a plug threaded in the other end of said tube and having an axial bore, said bore including a reduced outer end forming a valve seat within the bore, a reduced externally threaded sleeve integrally formed with said plug about said bore, a casing threaded on said sleeve and including an end plate having an aperture in registry with said bore, a needle valve slidably received in said bore and said casing and having a stem received in said aperture, said plug having a plurality of fluid channels extending in radial planes from the bore and connecting the bore with the interior of the tube, a spring surrounding said stem and biased between said end plate and said needle valve to yieldingly urge the needle valve against said seat and the needle valve to a position for closing the fluid channels, a lever pivoted on the support plate, and a lifting cord terminally secured to said lever and said stem, said support plate having a central opening receiving said cord.

JAMES M. HALL.

REFERENCES CITED

The following references are of record in the file of this patent:

UNITED STATES PATENTS

| Number | Name | Date |
| --- | --- | --- |
| 848,898 | Gregson | Apr. 2, 1907 |
| 896,761 | Rutenber | Aug. 25, 1908 |
| 1,353,193 | Townsend | Sept. 21, 1920 |
| 1,594,210 | Mann | July 27, 1926 |
| 1,759,444 | Dunn et al. | May 20, 1930 |

FOREIGN PATENTS

| Number | Country | Date |
| --- | --- | --- |
| 354,037 | France | July 17, 1905 |
| 192,146 | Great Britain | Jan. 25, 1923 |
| 70,415 | Sweden | Oct. 14, 1930 |